(12) United States Patent
Hata et al.

(10) Patent No.: US 8,177,598 B2
(45) Date of Patent: May 15, 2012

(54) DISPLAY MANUFACTURING METHOD

(75) Inventors: Fumio Hata, Mitaka (JP); Toshimitsu Tanaka, Hadano (JP); Kentaro Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/021,672

(22) Filed: Feb. 4, 2011

(65) Prior Publication Data
US 2011/0195631 A1 Aug. 11, 2011

(30) Foreign Application Priority Data
Feb. 9, 2010 (JP) ................................ 2010-026211

(51) Int. Cl.
*H01J 9/24* (2006.01)
(52) U.S. Cl. ...................... 445/24; 445/58; 427/428.08
(58) Field of Classification Search ................ 445/24, 445/58; 427/211, 428.08
See application file for complete search history.

(56) References Cited

U.S. PATENT DOCUMENTS

| | | | |
|---|---|---|---|
| 6,902,454 B1 * | 6/2005 | Petruchik | 445/24 |
| 6,979,243 B2 * | 12/2005 | Watanabe | 445/24 |
| 2003/0164673 A1 * | 9/2003 | Murtishaw et al. | 313/479 |
| 2003/0210933 A1 * | 11/2003 | Mouri et al. | 399/323 |
| 2005/0117941 A1 * | 6/2005 | Ohta et al. | 399/323 |
| 2008/0164687 A1 * | 7/2008 | Royle | 281/29 |
| 2008/0276440 A1 * | 11/2008 | Ohta et al. | 29/428 |
| 2009/0277578 A1 * | 11/2009 | Sung et al. | 156/285 |

FOREIGN PATENT DOCUMENTS

| | | | |
|---|---|---|---|
| JP | 2000-053453 A | | 2/2000 |
| JP | 2002189212 | * | 7/2002 |

* cited by examiner

*Primary Examiner* — Bumsuk Won
(74) *Attorney, Agent, or Firm* — Canon USA, Inc., IP Division

(57) ABSTRACT

In a display manufacturing method including bonding of a light-transmissive substrate onto a display surface of a display body, the bonding includes bending the light-transmissive substrate into an arch-like shape with a bonding surface thereof having a convex shape. An adhesive sandwiched is put between a bonding surface of the display body and a top of a bonding surface of the bent light-transmissive substrate. The bend of the light-transmissive substrate is released while moving two rollers from a center of the light-transmissive substrate in a direction of the bend of the light-transmissive substrate towards both terminal edges of the light-transmissive substrate in mutually reverse directions. The two rollers press a non-bonding surface of the light-transmissive substrate against the display body.

2 Claims, 8 Drawing Sheets

DISPLAY MANUFACTURING METHOD

BACKGROUND OF THE INVENTION

1. Field of the Invention

The present invention relates to a display manufacturing method. In particular, the present invention relates to a method for manufacturing a display in which to an outer display surface of a display body, a light-transmissive substrate is bonded to improve the anti-shock property and a display performance of the display.

2. Description of the Related Art

Japanese Patent Application Laid-Open No. 2000-053453 discusses a method for bonding a light-transmissive substrate (thin sheet glass) on an outer display surface of a display body to improve the anti-shock property and the display performance of the display. In this conventional method, at first, an adhesive is applied to either one of the display surface of the display body and the light-transmissive substrate. Furthermore, the light-transmissive substrate is bent to have a shape convex towards the display surface of the display body. Then the light-transmissive substrate is subjected to pressure by a roller from one edge to the opposing other edge thereof to be gradually bonded.

However, if the conventional method for pressing a light-transmissive substrate from one edge to the other using a roller as discussed in Japanese Patent Application Laid-Open No. 2000-053453 is used, the travel of the roller becomes longer as the size of the display surface of the display body becomes larger. Accordingly, if the size of the display surface of the display body is large, it may take a long time to complete the pressing. Therefore, the efficiency of manufacture may degrade.

The above-described problem may be prevented by increasing the speed of travel of the roller. However, if the speed of travel of the roller becomes higher than the speed of spread of an adhesive being sandwiched between bonding surfaces, then air bubbles may easily occur on the bonding surfaces. In addition, as the travel of the roller becomes longer, the thickness of the adhesive layer between the bonding surfaces tends to become uneven. Furthermore, as the area for spreading the adhesive becomes larger, the amount of waste adhesive that is spread off from a gap between the bonding surfaces may increase.

In addition, if one roller is moved in pressing the light-transmissive substrate, the light-transmissive substrate may slide while the roller is moved. Accordingly, the light-transmissive substrate may be shifted and misaligned.

SUMMARY OF THE INVENTION

According to an aspect of the present invention, a display manufacturing method includes bonding of a light-transmissive substrate onto a display surface of a display body. The light-transmissive substrate is bent into an arch-like shape with a bonding surface thereof having a convex shape. An adhesive sandwiched is put between a bonding surface of the display body and a top of a bonding surface of the bent light-transmissive substrate. The bend of the light-transmissive substrate is released while moving two rollers from a center of the light-transmissive substrate in a direction of the bend of the light-transmissive substrate towards both terminal edges of the light-transmissive substrate in mutually reverse directions. The two rollers press a non-bonding surface of the light-transmissive substrate against the display body.

Further features and aspects of the present invention will become apparent from the following detailed description of exemplary embodiments with reference to the attached drawings.

BRIEF DESCRIPTION OF THE DRAWING

The accompanying drawings, which are incorporated in and constitute a part of the specification, illustrate exemplary embodiments, features, and aspects of the invention and, together with the description, serve to explain the principles of the present invention.

DESCRIPTION OF THE EMBODIMENTS

Various exemplary embodiments, features, and aspects of the invention will be described in detail below with reference to the drawings.

The embodiments can solve the above-described problem that may arise in the display manufacturing method including bonding processing for bonding a bent light-transmissive substrate onto the display body using a roller. Specifically, the embodiments can cause the roller to travel only a short distance in manufacturing a large size display. In addition, the embodiments can prevent degradation of the efficiency of manufacture, unevenness of the thickness of an adhesive layer, increase in the amount of spread of the adhesive off a gap between bonding surfaces, and misregistration of a light-transmissive substrate.

In the embodiments, the light-transmissive board is pressed by moving two rollers in mutually reverse directions. Accordingly, it is sufficient for each roller to travel only a half distance compared to when only one roller is used. Therefore, in manufacturing a large-size display, it becomes unnecessary for the roller to travel a long distance. Accordingly, the embodiments can effectively prevent degradation of the efficiency of manufacture, unevenness of the thickness of an adhesive layer, and increase in the amount of spread of the adhesive off the gap of bonding surfaces.

In addition, by using two rollers, the light-transmissive substrate can be stably pressed. Accordingly, in the embodiments, the light-transmissive substrate may not easily be misaligned due to sliding of the light-transmissive substrate while the rollers are moved.

In the embodiments, a "terminal edge" of the display body or the light-transmissive substrate refers to one terminal side of the display body or the light-transmissive substrate which configures square-shaped plane. A "side edge" refers to a side of the display body or the light-transmissive substrate perpendicular to the terminal edge.

The embodiments are useful in manufacturing a flat-panel display including a panel, such as an electron beam display panel, a liquid crystal display (LCD) panel, an electroluminescence (EL) display panel, or a plasma display panel. However, the embodiments are not limited to manufacture of the above-described display. More specifically, the embodiments can also be useful in manufacturing a cathode ray tube (CRT) display.

In the embodiments, in manufacturing a flat-panel display, the "display body" refers to a panel portion constituting a display screen. On the other hand, in manufacturing a CRT display, the "display body" refers to a CRT portion.

A first exemplary embodiment of bonding processing, which is executed by the display manufacturing method according to the present invention, will be described in detail below with reference to FIGS. 1A through 1D, 2A through 2D, and 3A through 3H.

Figure 1A:
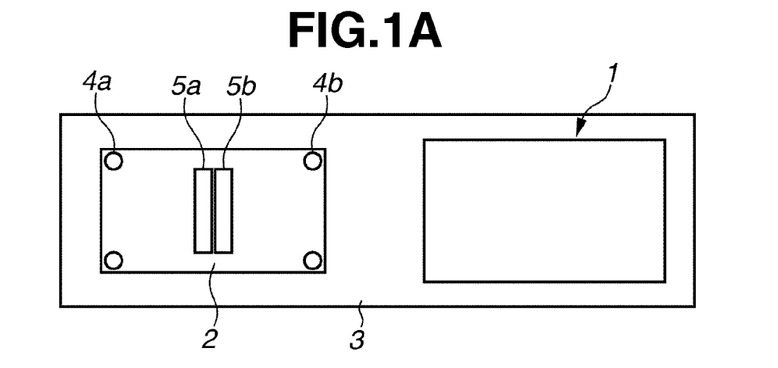
FIGS. 1A through 1D schematically illustrate a part of bonding processing executed by a method for manufacturing a display according to a first exemplary embodiment.
Figure 1B:
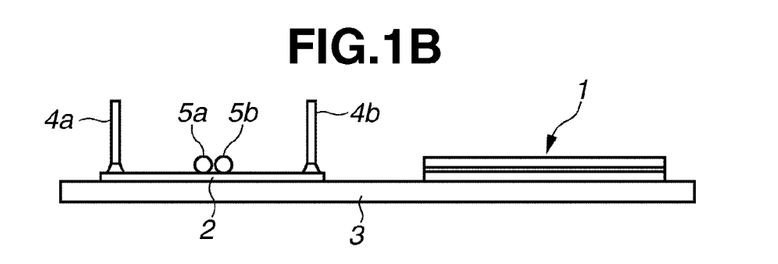
Figure 1C:
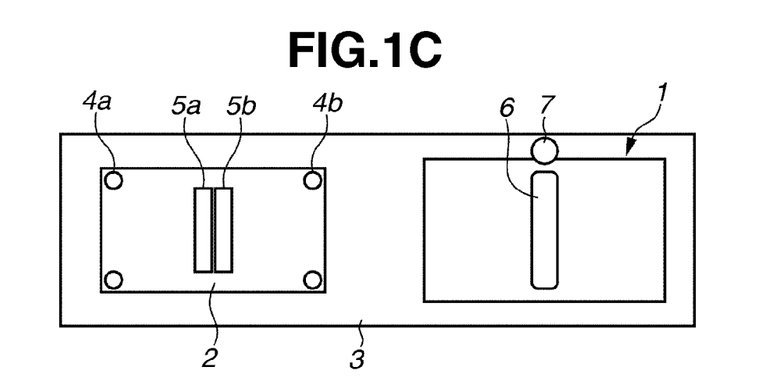
Figure 1D:
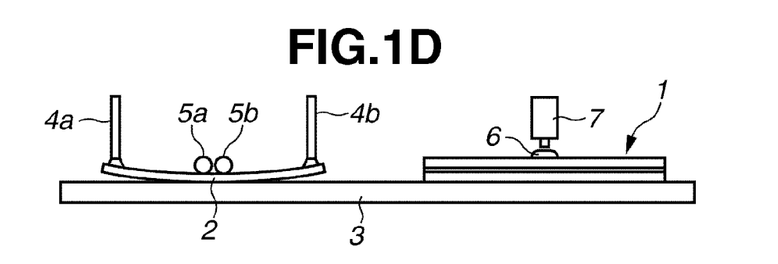

FIG. 1A is a plan view schematically illustrating a state in which a display body and a light-transmissive substrate are set on a stage. FIG. 1B is a schematic front view of the state illustrated in FIG. 1A. FIG. 1C is a plan view schematically illustrating a state in which an adhesive is applied onto a bonding surface of the display body and the light-transmissive substrate is bent. FIG. 1D is a schematic front view of the state illustrated in FIG. 1C.

Figure 2A:
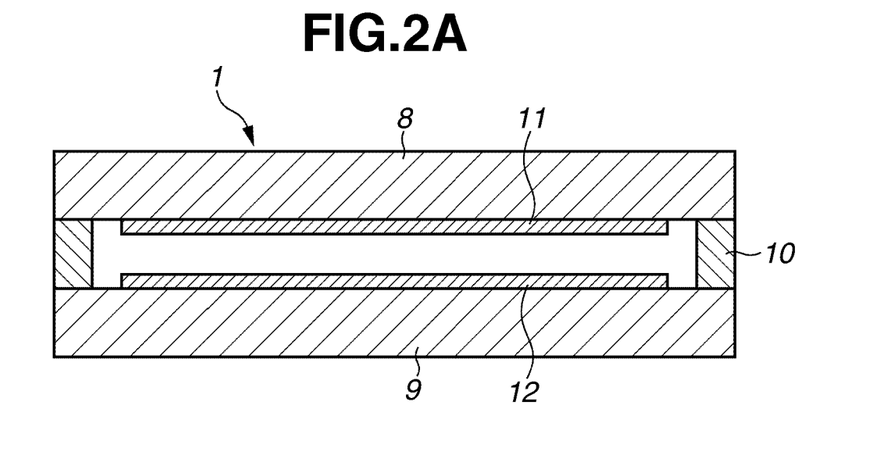
FIGS. 2A through 2D are cross sections schematically illustrating a display body and a light-transmissive substrate.
Figure 2B:
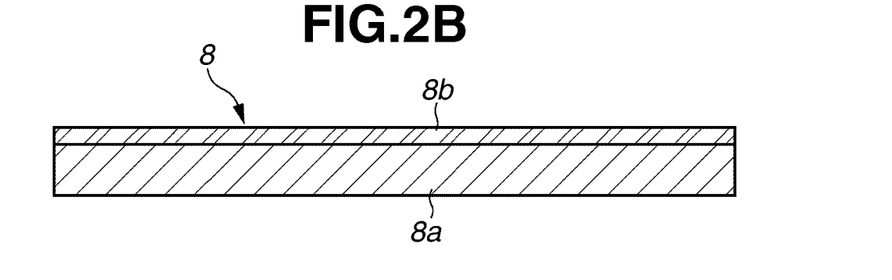
Figure 2C:
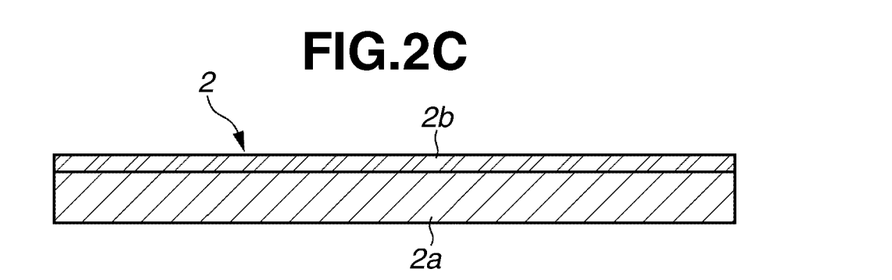
Figure 2D:
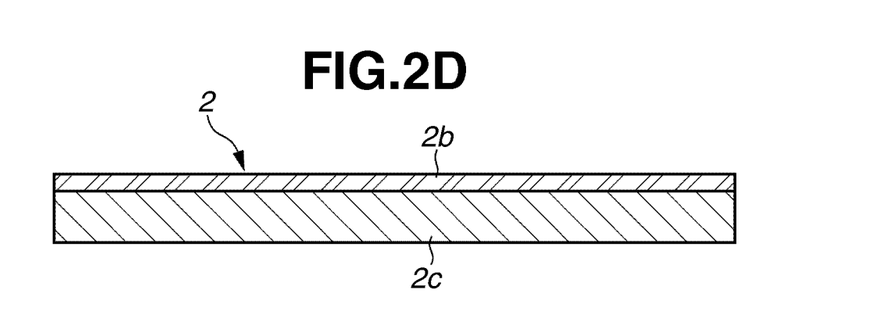

FIG. 2A is a schematic cross section of the entire display body. FIG. 2B is a schematic cross section of the display substrate constituting a display surface of the display body. FIGS. 2C and 2D each schematically illustrate a cross section of the light-transmissive substrate.

Figure 3A:
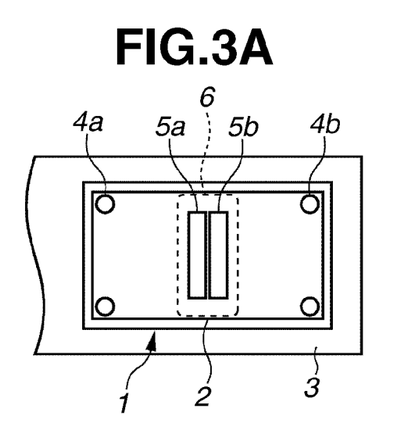
FIGS. 3A through 3H illustrate exemplary processing to be executed during bonding processing according to the first exemplary embodiment after the processing illustrated in FIGS. 1A and 1B.
Figure 3B:
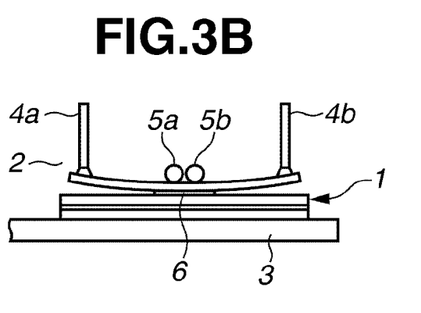

FIG. 3A is a plan view schematically illustrating a state in which an adhesive is nipped between the bonding surface of the display body and the top of the bonding surface of the bent light-transmissive substrate. FIG. 3B is a schematic front view of the state illustrated in FIG. 3A.

Figure 3C:
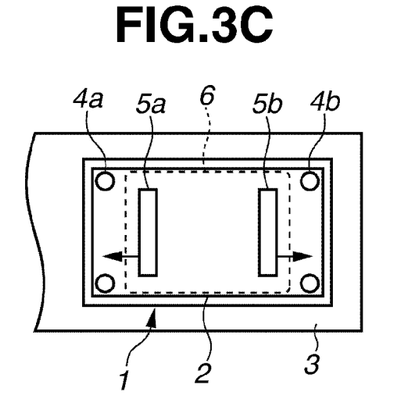
Figure 3D:
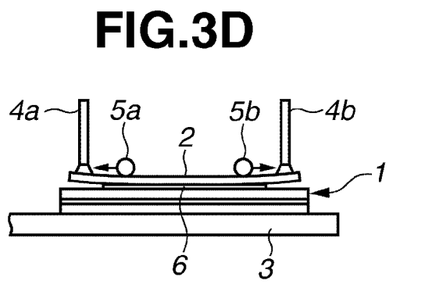

FIG. 3C is a plan view schematically illustrating a state in which the bend of the light-transmissive substrate is released by moving rollers towards both edges of the light-transmissive substrate. FIG. 3D is a schematic front view of the state illustrated in FIG. 3C.

Figure 3E:
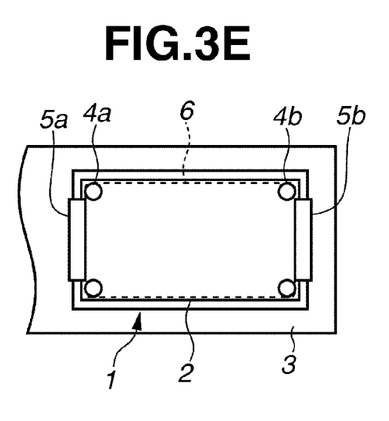
Figure 3F:
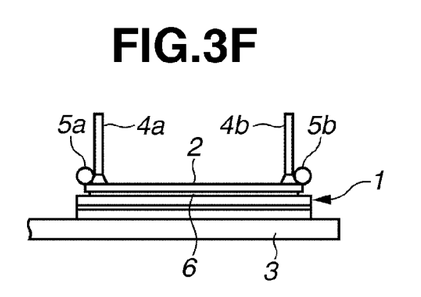

FIG. 3E is a plan view schematically illustrating a state in which the moving of the rollers and the release of the bend of the light-transmissive substrate have been completed. FIG. 3F is a schematic front view of the state illustrated in FIG. 3E.

Figure 3G:
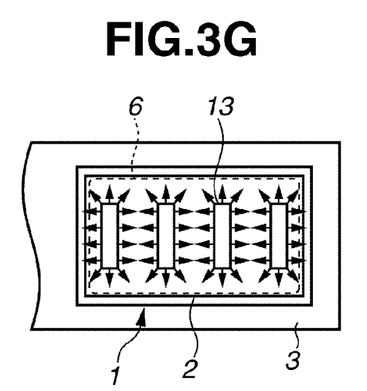
Figure 3H:
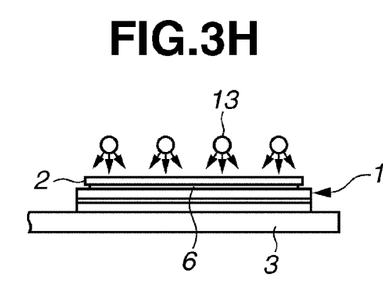

FIG. 3G is a plan view schematically illustrating a state in which the adhesive is irradiated with ultraviolet (UV) light to be cured. FIG. 3H is a schematic front view of the state illustrated in FIG. 3G. In FIGS. 1A through 1D, FIGS. 2A through 2D, and FIGS. 3A through 3H, a drive mechanism, an alignment mechanism, and a pressure mechanism, which implement an operation of devices, components, and units, are omitted for easier understanding.

FIG. 1A through 1D illustrate a display body 1, a light-transmissive substrate 2, a stage (display unit positioning stand) 3, retaining members 4a and 4b, rollers 5a and 5b, an adhesive 6, and a dispenser 7.

Referring to FIG. 2A, the display body 1 includes a display substrate 8, which constitutes a display surface, a back substrate 9, which constitutes a back surface, and a frame member 10, which constitutes a hermetic chamber together with the display substrate 8 and the back substrate 9.

In addition, an image display unit is provided in the hermetic chamber. In the case of manufacturing an electron beam display panel, the image display unit includes a phosphor 11, which is provided on the display substrate 8, and an electron source 12, which is provided on the back substrate 9.

Although not illustrated in the drawing, in manufacturing an LCD panel, the image display unit includes a liquid crystal, a transistor, and an electrode. On the other hand, in manufacturing an EL display panel, the image display unit includes an EL cell. Furthermore, in manufacturing a plasma display panel, the image display unit includes a phosphor, plasma generation gas, and an electrode.

Referring to FIG. 2B, the display substrate 8, which constitutes the display surface of the display body 1, can include a transparent glass 8a and a light-transmissive resin film 8b, which is bonded on the surface of the transparent glass 8a. Alternatively, the display substrate 8 can include the transparent glass 8a only. The light-transmissive resin film 8b includes a resin film having a function of charge suppression, light reflection suppression, or color filtering.

The light-transmissive substrate 2 is bonded on the outer surface of the display surface of the display body 1. As illustrated in FIGS. 2C and 2D, the light-transmissive substrate 2 includes a transparent glass 2a or a transparent resin substrate 2c and a light-transmissive resin film 2b, which is bonded on the surface thereof. Alternatively, the light-transmissive substrate 2 can include the transparent glass 2a or the transparent resin substrate 2c only.

Similar to the above-described light-transmissive resin film 8b, the light-transmissive resin film 2b is a resin film having a function of charge suppression, light reflection suppression, or color filtering. If the light-transmissive resin film 8b is provided to the display substrate 8 of the display body 1, a film having a function different from the function of the light-transmissive resin film 8b is usually used as the light-transmissive resin film 2b. However, a film having the same function as the light-transmissive resin film 8b can be used as the light-transmissive resin film 2b.

In order to improve the anti-shock property of the display body 1, it is useful if the light-transmissive substrate 2 includes the transparent glass 2a or the transparent glass 2a and the light-transmissive resin film 2b, which is bonded on the surface thereof In manufacturing a display, as illustrated in FIGS. 1A and 1B, each of the display body 1 and the light-transmissive substrate 2 is aligned and set on the stage 3 at first. The bonding surface of the display body 1, which is the display surface, is oriented upwards while the bonding surface of the light-transmissive substrate 2 is oriented downwards. Both bonding surfaces are subjected to pre-processing for washing the surfaces using an organic solvent, such as acetone.

Both terminal edges of the light-transmissive substrate 2 are retained by the retaining members 4a and 4b, respectively. In the present exemplary embodiment, the retaining members 4a and 4b can suction the light-transmissive substrate 2 using a suction member to suspend the light-transmissive substrate 2. However, the embodiments are not limited to this. More specifically, the light-transmissive substrate 2 can be suspended by mechanically grasping the same at the terminal edges thereof.

On a non-bonding surface (i.e., the surface of the light-transmissive substrate 2 opposite to the bonding surface) of the light-transmissive substrate 2, the two rollers 5a and 5b are provided. More specifically, the rollers 5a and 5b are provided in the light-transmissive substrate 2 at the center thereof in the direction of mutually opposing terminal edges thereof in parallel to each other.

The rollers 5a and 5b, which press the light-transmissive substrate 2 downwards, are provided so that the center axis thereof is directed in a direction perpendicular to side edges of the light-transmissive substrate 2 (i.e., in a direction parallel to the terminal edges).

Referring to FIGS. 1C and 1D, the retaining members 4a and 4b are ascended up to a predetermined position to lift both terminal edges of the light-transmissive substrate 2 having a fulcrum at a contact position of the non-bonding surface of the light-transmissive substrate 2 and the rollers 5a and 5b. In this manner, the light-transmissive substrate 2 is bent in the direction of mutually opposing terminal edges of the light-transmissive substrate 2 in an arch-like shape with the convex bonding surface of the light-transmissive substrate 2 towards the stage 3.

The light-transmissive substrate 2 usually has a rectangular shape. Accordingly, in order to easily bend the light-transmissive substrate 2, it is useful if the shorter sides of the light-transmissive substrate 2 are used as the terminal edges to be retained by the retaining members 4a and 4b.

In parallel with the bending operation, the adhesive 6 is applied to the bonding surface of the display body 1. Since the adhesive does not easily trickle down or flow, the adhesive 6 is usually applied on the bonding surface of the display body 1, which is set below the other bonding surface (i.e., the bonding surface of the light-transmissive substrate 2) during the bonding operation. However, alternatively, the adhesive 6 can be applied to the bonding surface of the light-transmissive substrate 2. Furthermore, the adhesive 6 can be applied to the entire bonding surface of the display body 1 or the light-transmissive board 2.

However, because the adhesive 6 can be spread as will be described below, the adhesive 6 can be applied at least at the center of the display body 1 or the light-transmissive substrate 2 in the direction of mutually opposing terminal edges of the display body 1 or the light-transmissive substrate 2. In this case, in order to easily spread the adhesive 6 on the entire bonding surface of the display body 1 or the light-transmissive substrate 2, it is useful to apply the adhesive 6 linearly by the length equivalent to the dimension of the terminal end substantially in parallel to the terminal end.

The adhesive 6 can be easily applied by causing the dispenser (constant-amount-liquid discharge device) 7, which applies pressure to the adhesive 6 to discharge the same, to discharge the adhesive 6 while being moved.

The adhesive 6 is not limited to a specific adhesive. In other words, any transparent adhesive, which may not affect the display, can be used as the adhesive 6. More specifically, a thermosetting adhesive, a room temperature setting adhesive, a two-pack reaction adhesive, or a UV curable adhesive can be used as the adhesive 6 where necessary.

The viscosity of the adhesive 6 can be selected from the range of 0.1 Pa·s to 10 Pa·s at 25° C. Among various types of transparent adhesives, the UV curable adhesive may be particularly useful because the UV curable adhesive does not apply heat load to the display body 1 and the tact time can be reduced.

In applying the adhesive 6, it is useful to previously defoam the adhesive 6 in a syringe. The defoaming of the adhesive 6 can be executed by centrifugal isolation or vacuum defoaming. However, if the amount of air contained in the adhesive 6 is sufficiently small, the defoaming can be omitted. After executing the defoaming where necessary, the adhesive 6 can be applied by mounting the syringe into the dispenser 7.

Referring to FIGS. 3A and 3B, the light-transmissive substrate 2 is displaced onto the display body 1 together with the retaining members 4a and 4b and the rollers 5a and 5b. Furthermore, the bonding surface of the display body 1 and the bonding surface of the light-transmissive substrate 2, which usually have a rectangular shape, are opposed to each other matching the orientations of the short sides with the long sides.

The display body 1 and the light-transmissive substrate 2 can be aligned by an alignment mechanism (not illustrated) generally in the unit of 0.1 mm. After mutually and vertically making the bonding surfaces of the display body 1 and the light-transmissive substrate 2 opposing each other, the light-transmissive substrate 2 is descended integrally with the retaining members 4a and 4b and the rollers 5a and 5b.

Accordingly, the adhesive 6 is nipped between the bonding surface of the display body 1 and the top of the bonding surface of the bent light-transmissive substrate 2. The adhesive 6 fills the nip between the bonding surface of the display body 1 and the top of the bonding surface of the bent light-transmissive substrate 2 in a continuous substantially linear shape.

Referring to FIGS. 3C and 3D, the two rollers 5a and 5b, which press the non-bonding surface of the light-transmissive substrate 2 against the display body 1, are moved in mutually reverse directions from the center of the light-transmissive substrate 2 in the direction of the bend towards each corresponding terminal edge of the light-transmissive board 2.

The two rollers 5a and 5b are moved in parallel with the bonding surface of the display body 1 in mutually reverse directions, under the same conditions, i.e., while maintaining the same pressing force against the light-transmissive substrate 2, and at the same speed. In addition, as the two rollers 5a and 5b are moved, the retaining members 4a and 4b are gradually descended. In this manner, the position retaining the light-transmissive substrate 2 by the retaining members 4a and 4b is moved towards the display body 1. Thus, the bend of the light-transmissive substrate 2 is released.

By moving the rollers 5a and 5b and releasing the bend of the light-transmissive substrate 2, the adhesive 6 is serially spread from the center of the light-transmissive substrate 2 in the direction of the bend towards both terminal edges thereof to be nipped between both bonding surfaces.

Then, both the rollers 5a and 5b are moved to both terminal edges of the light-transmissive substrate 2 as illustrated in FIGS. 3E and 3F. In addition, in this state, the bend of the light-transmissive substrate 2 is completely released. In this manner, the adhesive 6 is nipped between the bonding surfaces of the display body 1 and the light-transmissive substrate 2 with the substantially constant thickness.

The rollers 5a and 5b can be normally moved to the terminal edges of the light-transmissive substrate 2 by setting the length of the rollers 5a and 5b to be shorter than the distance between the retaining members 4a and 4b provided at both terminal edges and than the distance between the positions retaining the light-transmissive substrate 2.

Subsequently, the retaining members 4a and 4b are dismounted from the light-transmissive substrate 2. Then, the retaining members 4a and 4b and the rollers 5a and 5b are displaced from the light-transmissive substrate 2.

If the adhesive 6 is a room temperature setting adhesive or a two-pack reaction adhesive, the adhesive 6 is left unprocessed in this state to be further cured. On the other hand, as illustrated in FIGS. 3G and 3H for example, if the adhesive 6 is a UV curable adhesive, a UV lamp 13 is set above the light-transmissive substrate 2 to irradiate the adhesive 6 with UV light. In this manner, the adhesive 6 is cured and the bonding processing is completed.

In the present exemplary embodiment, the two rollers 5a and 5b are used. However, the number of the rollers 5a and 5b is not limited to two. In other words, four rollers can be used as the rollers 5. In this case, two pairs of rollers 5 can be moved in the mutually reverse directions.

In the exemplary embodiment described above, the adhesive 6 is cured after moving the rollers 5a and 5b to the terminal edges of the light-transmissive substrate 2. If the adhesive 6 is a UV curable adhesive, the adhesive 6 can be cured while the rollers 5a and 5b are being moved. An exemplary operation executed in this case will be described in detail below with reference to FIGS. 4A and 4B.

Figure 4A:
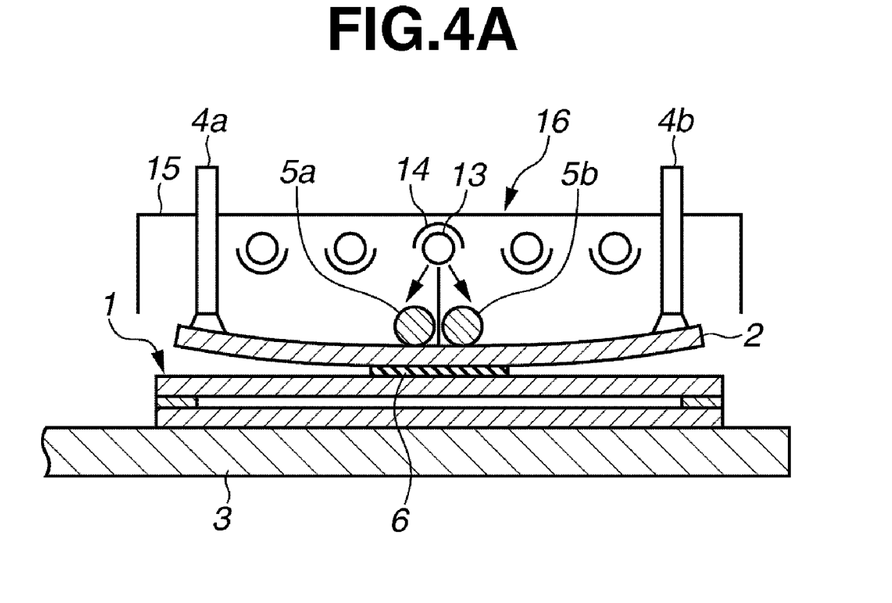
FIGS. 4A and 4B schematically illustrate another exemplary embodiment of a method for curing an adhesive.
Figure 4B:
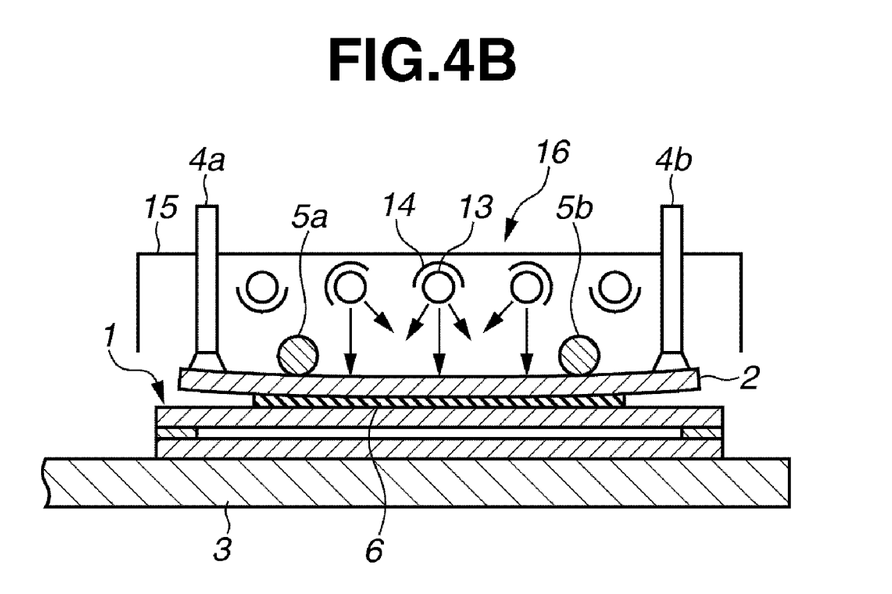

FIG. 4A is a schematic cross section of a state in which the adhesive 6 is nipped between the bonding surface of the display body 1 and the top of the bonding surface of the bent light-transmissive substrate 2. FIG. 4B is a schematic cross section of a state in which the rollers 5a and 5b are moved towards both terminal edges of the light-transmissive substrate 2 to release the bend of the light-transmissive substrate 2.

In the exemplary embodiment illustrated in FIGS. 4A and 4B, the retaining members 4a and 4b, the rollers 5a and 5b, the UV lamp 13, which includes a UV shutter 14, and a cover 15 constitute a bonding unit 16. Except the configuration of the bonding unit 16, the state illustrated in FIG. 4A corresponds to the state illustrated in FIGS. 3C and 3D and the state illustrated in FIG. 4B corresponds to the state illustrated in FIGS. 3E and 3F. Furthermore, in the exemplary embodiment illustrated in FIGS. 4A and 4B, a plurality of UV lamps 13, which includes the UV shutter 14, is arranged in the direction of moving the rollers 5a and 5b.

Similar to the above-described first exemplary embodiment, the light-transmissive substrate 2 is bent by retaining the same by the retaining members 4a and 4b at both terminal edges thereof and by pressing the light-transmissive substrate 2 by the rollers 5a and 5b at the center thereof.

In addition, as illustrated in FIG. 4A, the bent light-transmissive substrate 2 is moved to a position above the display body 1 integrally with the bonding unit 16. Then, the light-transmissive substrate 2 is descended together with the bonding unit 16 to nip the adhesive 6 between the bonding surface of the display body 1 and the top of the bonding surface of the bent light-transmissive substrate 2.

Subsequently, the movement of the rollers 5a and 5b is started. In addition, the UV shutters 14 of the UV lamps 13 are serially opened to start curing of the adhesive 6, which exists directly below the UV lamp 13. The rollers 5a and 5b are moved in the same manner as the first exemplary embodiment described above.

In addition, as illustrated in FIG. 4B, the UV shutter 14 is operated following the movement of the rollers 5a and 5b to serially extend the range of irradiation with the UV light. In the above-described manner, the pressing operation and the curing of the adhesive 6 are executed substantially at the same time. Accordingly, the time required for the operation can be reduced and the amount of the adhesive 6 that may run off both bonding surfaces can be reduced. In addition, the relative positions of the light-transmissive substrate 2 and the display body 1 can be fixed at a very high accuracy. Furthermore, the thickness of the adhesive 6 can easily become constant.

In the exemplary embodiment illustrated in FIGS. 4A and 4B, the UV shutters 14 are serially opened. However, instead of providing and using the UV shutters 14, the UV lamps 13 can be serially lit starting from the center of the light-transmissive substrate 2 towards the terminal edges of the light-transmissive substrate 2.

Now, a second exemplary embodiment of bonding processing, which is executed by the display manufacturing method according to the embodiments, will be described in detail below with reference to FIGS. 5A through 5C and FIGS. 6A and 6B. In the present exemplary embodiment, the retaining members 4a and 4b, which are used in the first exemplary embodiment, are not used. More specifically, clearance regulation members 17 are used instead of the retaining members 4a and 4b.

Figure 5A:
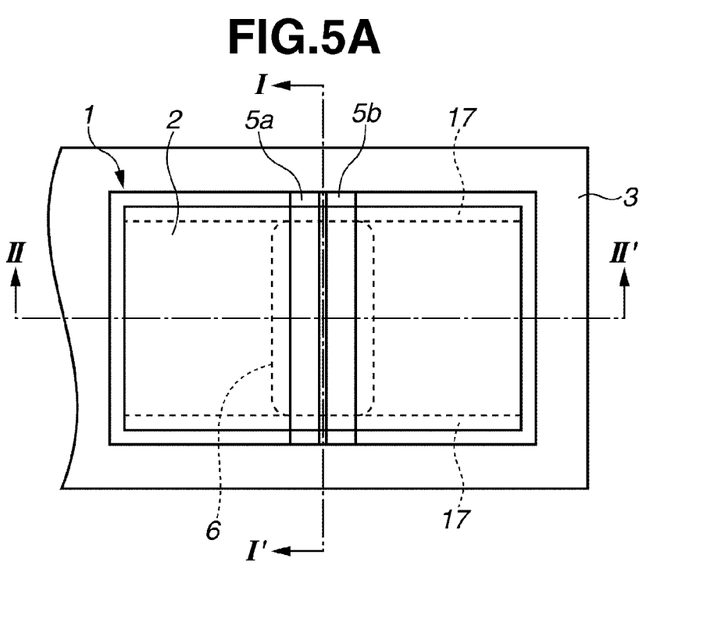
FIGS. 5A through 5C schematically illustrate a part of bonding processing executed by a method for manufacturing a display according to a second exemplary embodiment.
Figure 5B:
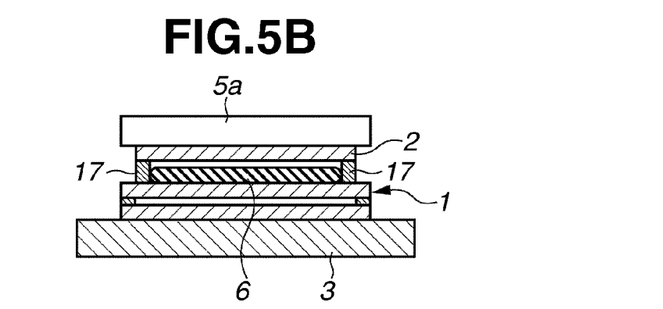
Figure 5C:
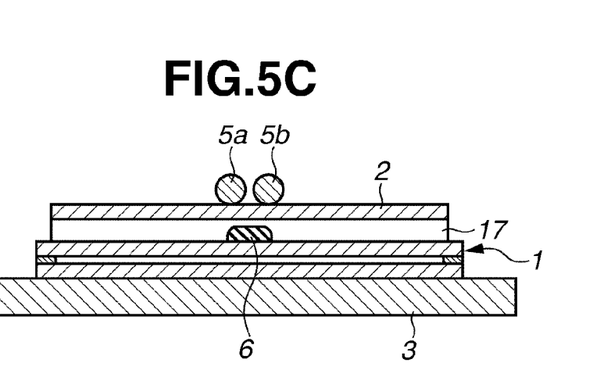

FIG. 5A is a plan view schematically illustrating a state in which the clearance regulation members 17 are sandwiched between the display body 1 and the light-transmissive substrate 2, which are set on the stage 3. FIG. 5B is a schematic cross section I-I' of the exemplary embodiment illustrated in FIG. 5A. FIG. 5C is a schematic cross section II-II' of the exemplary embodiment illustrated in FIG. 5A.

Figure 6A:
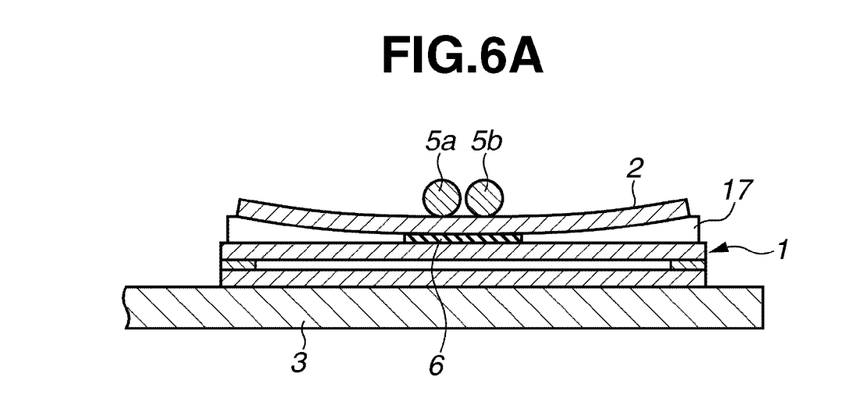
FIGS. 6A and 6B illustrate exemplary processing to be executed during bonding processing according to the second exemplary embodiment after the processing illustrated in FIGS. 5A and 5B.
Figure 6B:
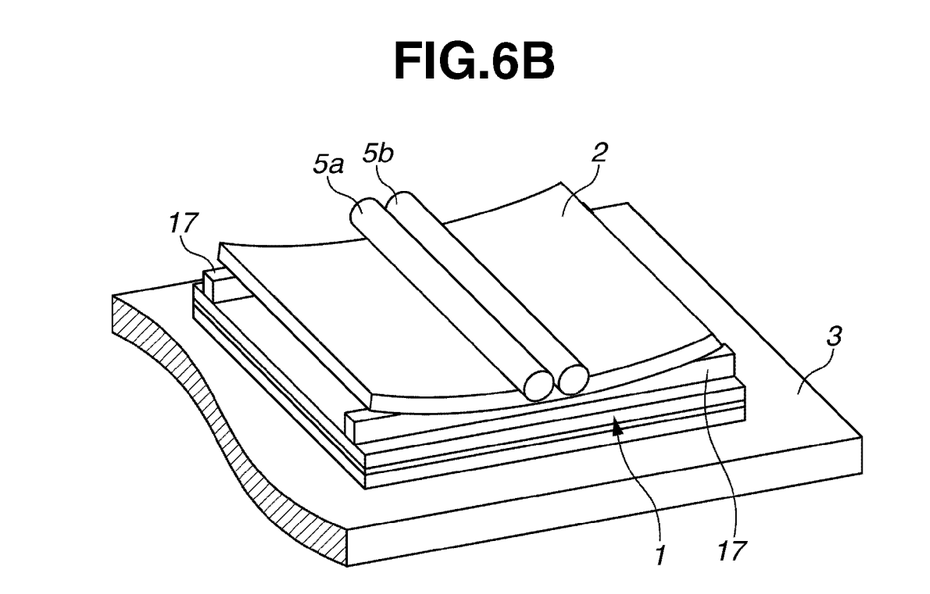

FIG. 6A is a schematic cross section illustrating a state after the light-transmissive substrate 2 is bent from the state illustrated in FIGS. 5A through 5C at a position corresponding to the line I-I' illustrated in FIG. 5A. FIG. 6B is a perspective diagram illustrating a state in which the light-transmissive substrate 2 is bent from the state illustrated in FIGS. 5A through 5C.

Referring to FIGS. 5A through 5C, in the present exemplary embodiment, the light-transmissive substrate 2 is set above the display body 1, which is set on the stage 3. In addition, each the clearance regulation members 17, which can be compression-deformed, are inserted between the display body 1 and the light-transmissive substrate 2 at both terminal edges thereof.

If the display body 1 and the light-transmissive substrate 2 form a rectangle, it is useful to nip the clearance regulation members 17 at the side edges (i.e., long sides) of the display body 1 and the light-transmissive substrate 2 so that the light-transmissive substrate 2 may be easily bent by pressing the same using the rollers 5a and 5b.

Due to the workability, the nipping process is performed in a manner such that the clearance regulation members 17 are bonded on the display body 1 set on the stage 3, at both side edges and then the light-transmissive substrate 2 is mounted on the clearance regulation members 17.

However, the embodiments are not limited to this. More specifically, the clearance regulation members 17 can be nipped between the display body 1 and the light-transmissive substrate 2 also by at first bonding the clearance regulation members 17 on the light-transmissive substrate 2 at both side edges thereof and then mounting the light-transmissive substrate 2 on the display body 1 with the surface on which the clearance regulation members 17 are bonded facing downwards.

In the present exemplary embodiment also, the two rollers 5a and 5b are used, but in the state illustrated in FIGS. 5A through 5C, the two rollers 5a and 5b merely exist at the center of the light-transmissive substrate 2 in the direction of mutually opposing terminal edges of the light-transmissive substrate 2 and do not press the light-transmissive substrate 2.

The clearance regulation members 17 can be compression-deformed in the mutually opposing direction of the display body 1 and the light-transmissive substrate 2. In the present exemplary embodiment, the clearance regulation members 17 can include a compressive material (the compressive material will be described in detail below) that can be compression-deformed by the pressing force applied by the two rollers 5a and 5b. However, instead of employing this configuration, the clearance regulation members 17 can include two layers including a compressive material layer and a non-compressive material layer, which cannot be compression-deformed by the pressing force applied by the two rollers 5a and 5b. The non-compressive material will be described in detail below.

If the two-layer configuration is employed for the clearance regulation members 17, the compressive material and the non-compressive material are laminated in the mutually opposing direction of the display body 1 and the light-transmissive substrate 2.

For the non-compressive material, a material having a high elastic ratio whose thickness cannot easily vary, such as a sheet of a resin including polyethylene terephthalate (PET), a sheet of a metal material, a tape, or a film, is used. In particular, a PET film can be used as the non-compressive material. On the other hand, for the compressive material, an elastically deformable material or a plastically deformable material can be used. In particular, various deformable materials, such as a sponge or styrofoam, can be used as the compressive material.

The compressive material and the non-compressive material can be laminated and bonded together when the resulting clearance regulation members 17 are mounted on the display body 1 or the light-transmissive substrate 2. Alternatively, the compressive material and the non-compressive material can be previously laminated and bonded together and then bonded to the display body 1 or the light-transmissive substrate 2.

In addition, in order to regulate the potential of the surface of the display body 1 when the clearance regulation members 17 are mounted onto the display body 1, a conductive material can be used as the material of the clearance regulation members 17. Furthermore, instead of providing contiguous stick-like shaped members along the side edges of the display body 1 or the light-transmissive substrate 2 as the clearance regulation members 17, a plurality of short pieces, each of which is shorter than the length of the side edge of the display body 1 or the light-transmissive substrate 2, can be provided discontiguously along the side edges of the display body 1 or the light-transmissive substrate 2.

In particular, as the clearance regulation member 17, it is useful to provide a member whose total length is substantially equivalent to the length of the side edges or the display body 1 or the light-transmissive substrate 2 substantially along the length of the side edges of the display body 1 or the light-transmissive substrate 2 in order to effectively prevent running of the adhesive 6 off the bonding surfaces that may otherwise occur when the adhesive 6 is spread when the light-transmissive substrate 2 is pressed.

On the other hand, if a plurality of short pieces shorter than the length of the side edge of the display body 1 or the light-transmissive substrate 2 is provided discontiguously along the side edges of the display body 1 or the light-transmissive substrate 2, it is useful to serially and contiguously arrange the pieces.

Furthermore, it is useful if the width of the clearance regulation member 17 is as narrow as possible in order to secure a largest possible image display area. More specifically, the width of the clearance regulation member 17 can be set within the range in which the light-transmissive substrate 2 can be stably retained above the display body 1 and an appropriately high compression intensity can be achieved.

The thickness of the clearance regulation member 17 (i.e., the dimension of the clearance regulation member 17 in the mutually opposing direction of the display panel body 1 and the light-transmissive substrate 2) can be determined according to the thickness of the applied adhesive 6 and the total thickness thereof after the clearance regulation member 17 is compression-deformed by the applied pressure. The thickness of applied adhesive 6 and the total thickness of the clearance regulation member 17 after compression-deformation by the pressure will be described in detail below.

To paraphrase this, for the thickness of the clearance regulation member 17, the thickness, with which the bonding surface of the light-transmissive substrate 2 does not contact the adhesive 6 when the display body 1 and the light-transmissive substrate 2 are merely set on the stage 3 (i.e., before the light-transmissive substrate 2 is pressed towards the display body 1) across the clearance regulation member 17, can be selected.

This configuration is useful because if this configuration is employed, it can be effectively prevented that when the display body 1 and the light-transmissive substrate 2 are set opposed to each other and mounted together, the bonding surface different from the other bonding surface on which the adhesive 6 is applied may contact the adhesive 6 and cause the adhesive 6 to contain air bubbles.

In addition, the thickness of the clearance regulation member 17 is adjusted to regulate the total thickness of the clearance regulation member 17 after being compression-deformed, becomes equivalent to a desired gap (i.e., the thickness of the adhesive layer) between the bonding surface of the display body 1 and the bonding surface of the light-transmissive substrate 2, in order to regulate the gap by the thickness of the clearance regulation member 17 after being compression-deformed.

The adhesive 6 is applied before setting the display body 1 and the light-transmissive substrate 2 across the clearance regulation member 17 with a clearance between the bonding surface of the display body 1 and the bonding surface of the light-transmissive substrate 2. In order to prevent adhesive from easily trickling down or running off, the adhesive 6 is applied on the bonding surface of the display body 1, which is usually set below the other bonding surface (i.e., the bonding surface of the light-transmissive substrate 2) during the bonding operation. However, alternatively, the adhesive 6 can be applied to the bonding surface of the light-transmissive substrate 2. Furthermore, the adhesive 6 can be applied to the entire bonding surface of the display body 1 or the light-transmissive substrate 2.

However, because the adhesive 6 can be spread as will be described below, the adhesive 6 can be applied at least at the center of the display body 1 or the light-transmissive substrate 2 in the direction of mutually opposing terminal edges of the display body 1 or the light-transmissive substrate 2, from which the pressing starts. If the adhesive 6 is applied at the center of the display body 1 or the light-transmissive substrate 2 in the direction of mutually opposing terminal edges thereof, in order to easily spread the adhesive 6 onto the entire bonding surface of the display body 1 or the light-transmissive substrate 2, it is useful to apply the adhesive 6 linearly by the length equivalent to the dimension of the terminal end substantially in parallel to the terminal end.

The adhesive 6 can be applied after the clearance regulation member 17 is bonded to the display body 1 and the light-transmissive substrate 2 and the display body 1 and the light-transmissive substrate 2 are set onto the stage 3 together with the clearance regulation member 17. Alternatively, the adhesive 6 can be applied before the clearance regulation member 17 is bonded to the display body 1 and the light-transmissive substrate 2 and the display body 1 and the light-transmissive substrate 2 are set onto the stage 3 together with the clearance regulation member 17.

Subsequently, as illustrated in FIGS. 6A and 6B, the two rollers 5a and 5b press the light-transmissive substrate 2 towards the display body 1 at the center of the light-transmissive substrate 2 in the direction of mutually opposing terminal edges of the light-transmissive substrate 2. By pressing the light-transmissive substrate 2 in this manner, the center of the clearance regulation members 17 is compression-deformed by the amount greater than the compression-deformation occurring at both terminal edges. In this state, the light-transmissive substrate 2 is bent in a downward convex (arch-like) shape.

In this manner, the adhesive 6 is nipped between the bonding surface of the display body 1 and the top of the bonding surface of the bent light-transmissive substrate 2. In this state, similar to the above-described first exemplary embodiment, the two rollers 5a and 5b are moved in the mutually reverse directions from the center of the bend of the light-transmissive substrate 2 towards the terminal edges thereof to serially compression-deform the clearance regulation members 17 from the center towards both terminal edges thereof.

In this manner, the clearance between the bonding surface of the display body 1 and the bonding surface of the light-transmissive substrate 2 is gradually reduced and the adhesive 6 is gradually spread to be nipped between the bonding surface of the display body 1 and the bonding surface of the light-transmissive substrate 2. At the same time, the bend of the light-transmissive substrate 2 is automatically released.

In the present exemplary embodiment, the clearance regulation members 17 are compression-deformed by the pressure applied by the two rollers 5a and 5b by a specific constant amount. Accordingly, the embodiments can provide the uniform gap between the bonding surface of the display body 1 and the bonding surface of the light-transmissive substrate 2 and can arrange the thickness of the adhesive 6 to be constant over the entire bonding surface.

More specifically, the thickness of the clearance regulation member 17 can be set so that the thickness of the clearance regulation member 17 when compression-deformed by the two rollers 5a and 5b to the limit of the deformation thereof may become equivalent to the desired thickness of the adhesive layer. Alternatively, according to the relationship between the pressing force from the two rollers 5a and 5b and the thickness of the clearance regulation member 17, which is previously examined, the pressing force from the two rollers 5a and 5b can be controlled during the pressing operation by the two rollers 5a and 5b in order to achieve the desired thickness of the adhesive layer.

In the present exemplary embodiment, for the rollers 5a and 5b, rollers having the length equal to or longer than the length of the terminal edge of the light-transmissive substrate 2 can be used. Accordingly, it becomes easy to press the entire surface of the light-transmissive substrate 2 by the uniform pressing force.

If the adhesive 6 is a UV curable adhesive, the adhesive 6 can be cured after the two rollers 5a and 5b have been completely moved similar to the first exemplary embodiment described above. Alternatively, the adhesive 6 can be cured while moving the two rollers 5a and 5b as in the above-described first exemplary embodiment.

Figure 7:
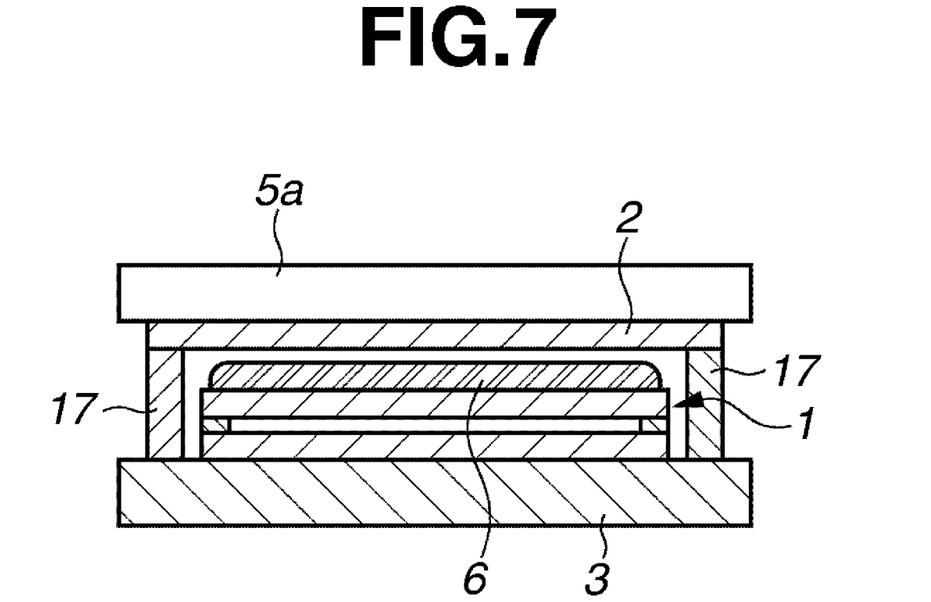
FIG. 7 schematically illustrates another exemplary embodiment of arrangement of clearance regulation members.

Now, another exemplary embodiment of arranging the clearance regulation members 17 will be described in detail below with reference to FIG. 7. FIG. 7 is a schematic cross section taken along the line I-I' in FIG. 5A.

In the present exemplary embodiment, the clearance regulation members 17 are set between a portion of the stage 3 along the outside of the each side edge of the display body 1 and both terminal edges of the light-transmissive substrate 2. Furthermore, the present exemplary embodiment has a characteristic effect of leaving no clearance regulation member 17 between the bonding surface of the display body 1 and the bonding surface of the light-transmissive substrate 2 after the display body 1 and the light-transmissive substrate 2 are bonded together.

If the entire clearance regulation member 17 is made of an elastically deformable material, the clearance regulation member 17 can be used repeatedly.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-026211 filed Feb. 9, 2010, which is hereby incorporated by reference herein in its entirety.

What is claimed is:

1. A display manufacturing method including bonding of a light-transmissive substrate onto a display surface of a display body, wherein the bonding comprises:

bending the light-transmissive substrate into an arch-like shape with a bonding surface thereof having a convex shape;

putting an adhesive sandwiched between a bonding surface of the display body and a top of a bonding surface of the bent light-transmissive substrate; and releasing the bend of the light-transmissive substrate while moving two rollers, which press a non-bonding surface of the light-transmissive substrate against the display body, from a center of the light-transmissive substrate towards both terminal edges of the light-transmissive substrate in mutually reverse directions along the bending, wherein bending the light-transmissive substrate includes mounting the display body and the light-transmissive substrate together across a compression-deformable clearance regulation member, pressing the light-transmissive substrate at a center of the non-bonding surface of the light-transmissive substrate in a direction of mutually opposing terminal edges of the light-transmissive substrate using the two rollers, and causing a center of the clearance regulation member to be compression-deformed to a greater degree than compression deformation of the clearance regulation member occurring at both terminal edges, and wherein releasing the bend of the light-transmissive substrate includes putting the adhesive sandwiched between the bonding surface of the display body and the top of the bonding surface of the bent light-transmissive substrate and causing the clearance regulation member to be serially compression-deformed from the center towards both terminal edges thereof by moving the two rollers.

2. A display manufacturing method including bonding of a light-transmissive substrate onto a display surface of a display body, wherein the bonding comprises:

bending the light-transmissive substrate into an arch-like shape with a bonding surface thereof having a convex shape;

putting an adhesive sandwiched between a bonding surface of the display body and a top of a bonding surface of the bent light-transmissive substrate; and releasing the bend of the light-transmissive substrate while moving two rollers, which press a non-bonding surface of the light-transmissive substrate against the display body, from a center of the light-transmissive substrate towards both terminal edges of the light-transmissive substrate in mutually reverse directions along the bending, wherein bending the light-transmissive substrate includes setting the display body on a stage, mounting the display body and the light-transmissive substrate together across compression-deformable clearance regulation members, which are inserted between a portion of the stage along an outside of both terminal edges of the display body and both side edges of the light-transmissive substrate, pressing the light-transmissive substrate at a center of the non-bonding surface of the light-transmissive substrate in a direction of mutually opposing terminal edges of the light-transmissive substrate using the two rollers, and causing a center of the clearance regulation member to be compression-deformed to a greater degree than compression deformation of the clearance regulation member occurring at both terminal edges, and wherein releasing the bend of the light-transmissive substrate includes putting the adhesive sandwiched between the bonding surface of the display body and the top of the bonding surface of the bent light-transmissive substrate and causing the clearance regulation member to be serially compression-deformed from the center towards both terminal edges thereof by moving the two rollers.

* * * * *